United States Patent [19]
Kilian

[11] Patent Number: 5,224,915
[45] Date of Patent: Jul. 6, 1993

[54] PUNCH PRESS WITH DUAL TOOL CHANGING ASSEMBLIES AND METHOD OF PUNCHING

[75] Inventor: Friedrich Kilian, Avon, Conn.
[73] Assignee: Trumpf Inc., Farmington, Conn.
[21] Appl. No.: 942,737
[22] Filed: Sep. 9, 1992
[51] Int. Cl.$^5$ .............................................. B23Q 3/155
[52] U.S. Cl. .......................................... 483/1; 83/563; 483/29
[58] Field of Search ...................... 483/28, 29, 1, 4, 14; 83/559, 563, 549; 72/442

[56] References Cited

U.S. PATENT DOCUMENTS

| | | | |
|---|---|---|---|
| 4,587,716 | 5/1986 | Byton | 83/563 X |
| 4,624,044 | 11/1986 | Bredon | 483/29 |
| 4,719,691 | 1/1988 | Klingel | 483/29 |
| 4,869,141 | 9/1989 | Klingel | 83/559 X |
| 4,951,375 | 8/1990 | Erlenmaier | 483/4 |

FOREIGN PATENT DOCUMENTS

| | | | |
|---|---|---|---|
| 228620 | 9/1989 | Japan | 483/29 |
| 3-66428 | 3/1991 | Japan | 483/29 |

*Primary Examiner*—William Briggs

[57] ABSTRACT

A punch press has a frame with a rotatable ram having a tool mounting portion at its lower end and a rotatable die holder in the base of the frame, and it has a tool mounting portion. The tool mounting portions of the ram and die holder are aligned and have tool receiving passages at a point about their periphery. A work support table is provided about the work station and its upper surface provides a workpiece support. The press has a workpiece guidance system which includes an elongated rail and a multiplicity of tool holders supported on the rail for movement therewith. The press also includes a tool storage and transfer assembly at the outer end of the frame with a tool storage magazine rotatable about a horizontal axis and having tool holders spaced about the major portion of its periphery. Its periphery is truncated so that in one rotated position it does not extend above the work support surface, but, in the other rotated position, its tool holders are horizontally aligned with the tool receiving passages. The punch press includes a computer control which effects rotation of the lower portion of the ram and of the die holder to orient the tool receiving passages in the desired direction, effects rotation of the magazine and operation of its element to insert or retrieve tooling in the tool mounting portions and effects movement of the rail to effect transfer of tooling to and from its tool holders.

15 Claims, 7 Drawing Sheets

PUNCH PRESS WITH DUAL TOOL CHANGING ASSEMBLIES AND METHOD OF PUNCHING

BACKGROUND OF THE INVENTION

The present invention relates to punch presses using a punching tool set which can be readily changed by machine controlled movement of the punch and die from a tool storage area which is a part of the press assembly.

Punch presses are widely employed for producing cutouts of various shapes in workpieces. In a nibbling machine, the punch tooling is operated repetitively as the workpiece is being moved through the work station to produce a large cutout of a desired contour. As used herein, the term "punch press" includes presses which punch holes at spaced apart locations in the workpiece and nibbling type punch presses which move the workpiece under the punch to effect punching at contiguous positions to cut an extended contour.

Although there are manually operated punch presses wherein the operator moves the workpiece on the support table relative to the work station, most modern or high volume punch presses include an X-Y coordinate guide system and numeric control system to clamp and move the workpiece automatically in accordance with a predetermined program. Moreover, since many are intended to produce cutouts of various sizes and configurations, magazines of various types have been provided to carry a multiplicity of sets of punch and die tooling for use at the work station.

There are a number of versions of such punch presses which use tool holders providing interchangeable tool sets since processing a piece in a modern plant may require the use of a number of tool sets, one after another. As soon as one tool set has finished its action, it is exchanged for a second, and then a third, etc. When the workpiece has been fully processed, the operator may start punching the next workpiece, starting again with the first tool set.

In some punch presses and nibbling machines, the cooperating punch and die tooling is respectively carried in upper and lower turrets which rotate the tooling into the operative work station position. One of the turrets is located below the support plane of the workpiece and the other is located thereabove; and the ram strikes the punch to drive it downwardly within the upper turret against the workpiece and into the die which is supported in the lower turret. As will be appreciated, such turret-type magazines occupy a substantial amount of space and impede access of the operator to portions of the press.

In most tool changer punch presses, the tooling is stored in a tool storage assembly at the front of the frame, and a transfer mechanism is provided to move the desired tooling therefrom into forwardly facing passages in the tool holding elements on the ram and die holder. Such tool changer type presses have the advantage of effecting firm coupling of the punch to the ram, and positive support for the die below the workpiece. A particularly advantageous type of tool storage and transfer assembly at the front of the press for a compact punch press is illustrated and described in Klingel U.S. Pat. No. 4,719,691 granted Jan. 19, 1988.

In Erlenmaier U.S. Pat. No. 4,951,375 granted Aug. 28, 1990, there is illustrated and described a punch press in which tool sets are carried on the horizontal rail of the workpiece guidance system and the tool sets are moved thereby through rearwardly facing passages into the tool holding elements on the ram and die holder.

In both of these types of tool changer assemblies, there are physical limitations on the number of tool sets which are stored. Accordingly, installations which require a greater number of tool sets to process workpieces have frequently employed robots to move tools to and from large tool storage racks adjacent the punch press. Such assemblies tend to be costly and may often greater programming skill.

It is an object of the present invention to provide a novel press in which tool feeding to, and removal from, the tool mounting assemblies of the ram and die holder may be effected automatically from two discrete storage areas in the press.

It is also an object to provide such a press in which the tool sets in the punching station may be exchanged rapidly while the workpiece remains on the work support table and clamped in the guidance system.

SUMMARY OF THE INVENTION

It has now been found that the foregoing and related objects may be readily attained in a punch press which includes a frame having a base and a head spaced thereabove with a neck extending therebetween at the rear end thereof. A ram is reciprocatably mounted in the head for reciprocal movement relative to the base along a vertical axis defining a work station, and at least the lower portion of the ram is rotatable about its vertical axis. Die holding means is rotatably mounted in the base at the work station, and tool mounting means is provided in the lower portion of the ram and in the die holding means for releasably mounting a cooperating punch and die, and both mounting means has tool receiving passages at one point about the periphery thereof. The press also includes work support table means about the work station and its upper surface providing a workpiece support surface.

A workpiece guidance system on the frame includes an elongated rail extending transversely of the base adjacent the neck, and the system is supported on the frame for clamping an associated workpiece and effecting its movement on the work table relative to the work station along horizontal, perpendicularly oriented X and Y axes. A multiplicity of tool holders is supported on the rail for movement therewith, and the tool holders project forwardly therefrom and have tool seating portions at the forward end thereof. Punch and die sets are disposed in at least some of the tool holders. The guidance system includes means for moving the rail with the tool holders to cause the tool holders to abut the tool mounting means in the ram and die holding means and to transfer a punch and die between the holders and the tool mounting means.

The punch press also includes a tool storage and transfer assembly at the opposite or front end of the frame which includes a magazine having its principal dimensions extending in a vertical plane parallel to the axis of reciprocation of the ram and rotatable about a horizontal axis perpendicular thereto. The magazine has a major portion with a periphery circumscribing an arc of a first radial distance from the horizontal axis and a minor portion having a periphery of a second radial distance from the horizontal axis reduced from that of the first radial distance. The peripheries of the major and minor portions are generally continuous and define a closed geometric figure, and the magazine has a multiplicity of tool holders at spaced points about the periphery of the major portion, each adapted to seat releasably a punch and die to seat in the tool mounting means.

The storage and transfer assembly also includes means mounting the magazine for rotation about the horizontal axis which is spaced a distance below the plane of the work support surface, which is of a dimension to locate the tool holders in horizontal alignment with the tool mounting means when the magazine is rotated to locate them in the uppermost position. The magazine minor portion reduced radial distance is of a dimension relative to the horizontal axis so that its periphery does not extend above the plane of the work support surface when rotated into the uppermost position. The storage and transfer assembly also includes means for transferring tooling between the uppermost tool holder of the magazine and the tool mounting means of the punch press, and means for rotating the magazine. This rotating means orients a selected tool mounting receptacle in the uppermost position for tooling transfer by the transferring means and thereafter rotates the magazine to orient the reduced peripheral portion in the uppermost position so that the plane of the workpiece support surface is not spaced above the magazine to permit free motion of a workpiece thereover on the workpiece support surface.

Control means is provided (i) for effecting rotation of the lower portion of the ram and of the die holding means, (ii) for effecting rotation of the magazine and operation of the transferring means, and (iii) for effecting movement of the rail to effect transfer of tooling to and from its tool holders. As a result, the lower portion of the ram and the die holder may be rotated to orient the tool receiving passages for receiving from, or discharging tools to, the tool holder on the rail, and the tool holders in the magazine. Preferably, the tool holders are removably supported on the rail so that tool holders may be readily replaced on the rail.

The control means effects movement of the guidance system to move the rail to bring the selected tool holder into alignment with the work station and then to move the tool holder forwardly of the work station to insert the tools into the tool mounting means, or to extract them during unloading.

In one sequence of operation, the control means orients the tool receiving passages of the ram and the die holding means into a position facing the tool storage and transfer assembly, effects rotation of the magazine of the tool storage and transfer assembly to align an empty tool holder therewith, transfers the tooling in the tool mounting means therefrom and into the empty tool holder, effects rotation of the ram lower portion and die support to orient the tool receiving passages facing the rail, moves the rail to bring a selected tool holder thereon into alignment with the tool mounting means, and transfers the tools therein into the tool mounting means.

In another sequence, the control means effects rotation of the ram lower portion and die support to orient the tool receiving passages facing the rail, moves the rail to bring an empty tool holder thereon into alignment with the tool mounting means, transfers the tools in the tool mounting means into the tool holder, orients the tool receiving passages of the ram and die holding means into a position facing the tool storage and transfer assembly, effects rotation of the magazine of the tool storage and transfer assembly to align a selected tool holder therewith, and transfers the tooling from the tool mounting means into the empty tool holder.

Desirably, the work table is movable relative to the work station and the control means is effective to control movement thereof. Thus, the work support table may be moved with the workpiece thereon to support the workpiece as it is moved to a position spaced beyond the work station during tool changing movement of the rail, or to a position inwardly of the work station during tool changing movement of the tool storage and transfer assembly.

Preferably, the tool holders have a pair of spaced tool carrying seats for a cooperating punch and die set, and the tool carrying seats are horizontally aligned with the mounting means of the ram and of the die holding means, when they are moved into the tool changing position.

In the preferred embodiment, the magazine, mounting means and transfer means are disposed upon a common base which is removably engageable with the punch press frame. The magazine is of truncated generally circular peripheral configuration with a portion of its periphery removed to provide a chordal surface at a radial distance not greater than the radial spacing to the plane of the work support table.

Thus, in a punching method, one sequence involves placing a workpiece on the work table support means and clamping it in the guidance system, and rotating the lower portion of the ram and die holding means to orient the tool receiving passages facing the tool rail. The guidance system is actuated to move the workpiece outwardly of the work station, and a selected set of tools is transferred into the tool mounting means from a tool holder stored on the rail. The workpiece is punched with this set of tools, and the guidance system is then actuated to move the workpiece outwardly of the work station. The tooling is transferred from the tool mounting means into the empty tool holder on the rail, and the lower portion of the ram and the die holding means are rotated to orient the tool receiving passages facing the tool storage and transfer assembly. The guidance system is actuated to move the workpiece inwardly of the work station, and a second selected set of tools stored in the magazine is transferred into the tool mounting means. The workpiece is then punched with the second selected set of tools.

In the reverse sequence, the tools in the tool mounting means are initially transferred into an empty tool holder of the magazine and a second set of tools is inserted from a tool holder on the rail.

DETAILED DESCRIPTION OF THE ILLUSTRATED EMBODIMENTS

Figure 1:
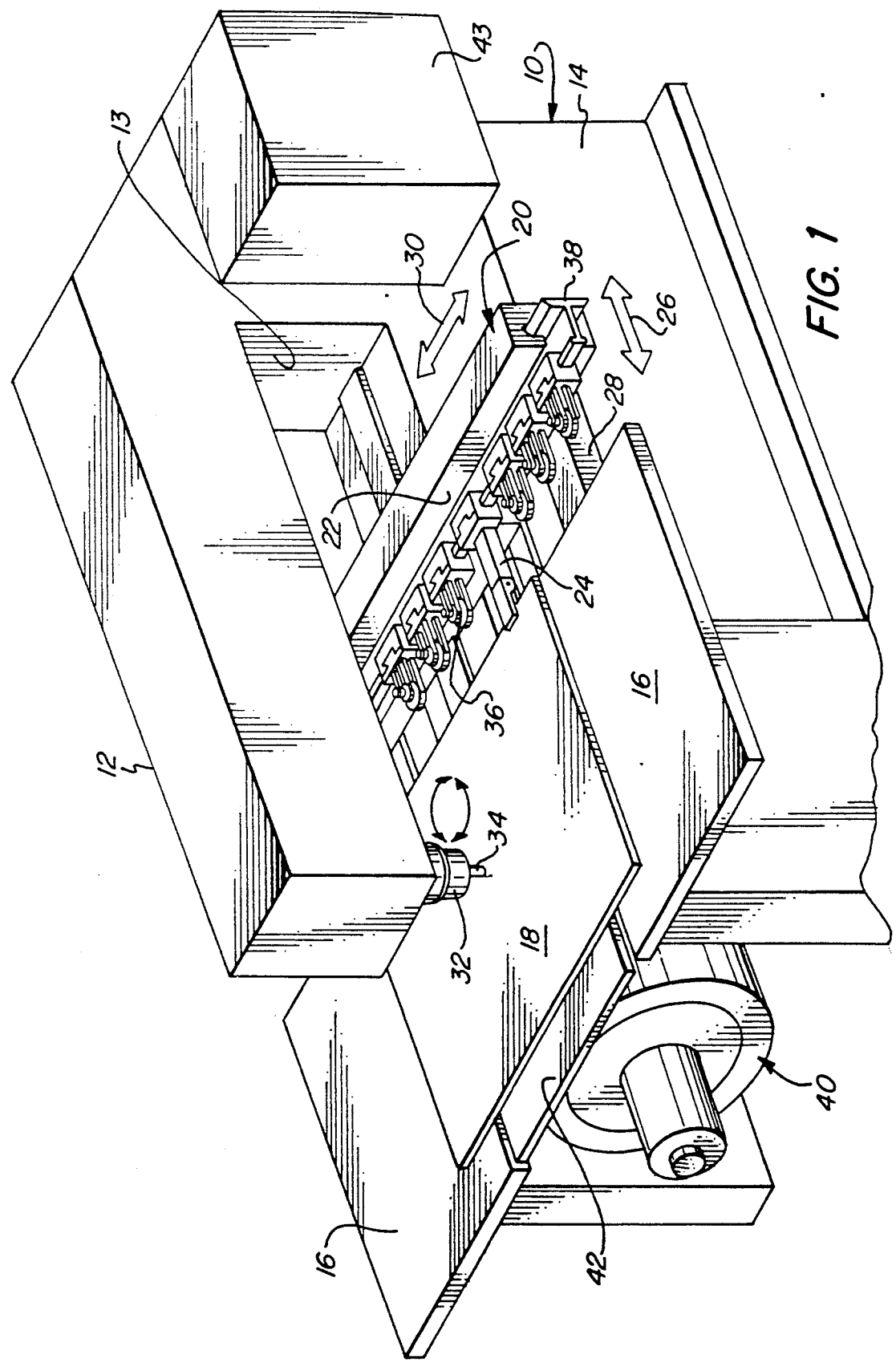
FIG. 1 is a fragmentary perspective view of a punch press embodying the present invention, with a workpiece disposed thereon and with the computer control schematically illustrated.

Turning first to FIG. 1 of the attached drawings, therein illustrated fragmentarily is a punch press embodying the present invention and having a frame generally designated by the numeral 10. The cantilevered, forwardly extending head or arm 12 is disposed over and supported by the neck 13 on the bifurcated base 14 upon which is slidably supported a pair of laterally spaced workpiece support tables 16 for supporting the workpiece 18. To effect motion of the workpiece 18 relative to the punching station, the machine has a workpiece clamping and guidance system generally designated by the numeral 20 which includes the transverse rail or carrier track 22 which carries clamps 24 for engaging the workpiece 18. The guidance system 20 may be moved forwardly and rearwardly as shown by the double headed arrow 26, on the Y-axis carriage 28 which slides on rails on the base 14, and the rail 22 may be moved perpendicularly thereto as seen by the double headed arrow 30. The tables 16 are bolted to the carriage 28 so as to move along the Y-axis with the guidance system 20.

As is well known in this type of press and as seen in FIG. 1, a ram generally designated by the numeral 32 in the head 12 of the punch press includes the upper portion of the tool mounting assembly which is configured to receive and firmly seat the punch 34. Tool holders or cassettes generally designated by the numeral 36 are seated in the intermediate support member 38 carried by the transverse rail 22 of the workpiece guidance system 20.

At the front end of the punch press between the legs of the bifurcated base 14 is a tool magazine and transfer assembly generally designated by the numeral 40 including a cover plate 42 which is disposed between, and provides a workpiece support surface coplanar with, the tables 16.

As is conventional with such cassette-type tool storage elements and as seen in FIGS. 4-7, the several tools comprising the punch tooling comprise the punch 34, the die 44 and the stripper 46. As is also conventional, the punch 34 and stripper 46 are normally seated in the upper portion 48 of the tool mounting assembly while the die 44 is inserted into a die holder 50 in the base 14 comprising the lower portion 52 of the tool mounting assembly.

Figure 2:
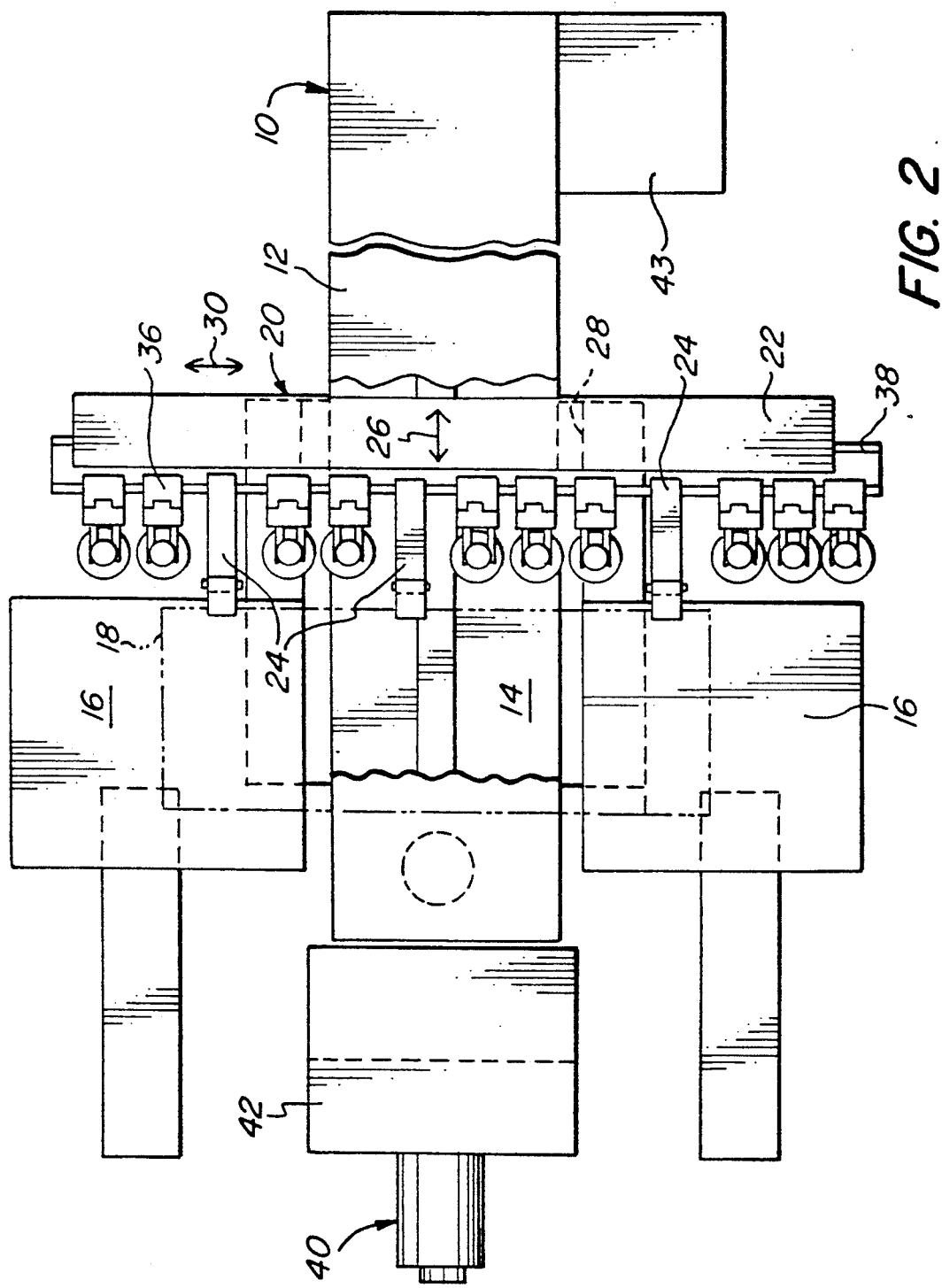
FIG. 2 is a plan view of the punch press of FIG. 1, and with a portion of the head of the frame broken away for purposes of illustration, and showing the workpiece in phantom line as engaged by the clamps of the workpiece guidance system and with the work support table moved inwardly.
Figure 3:
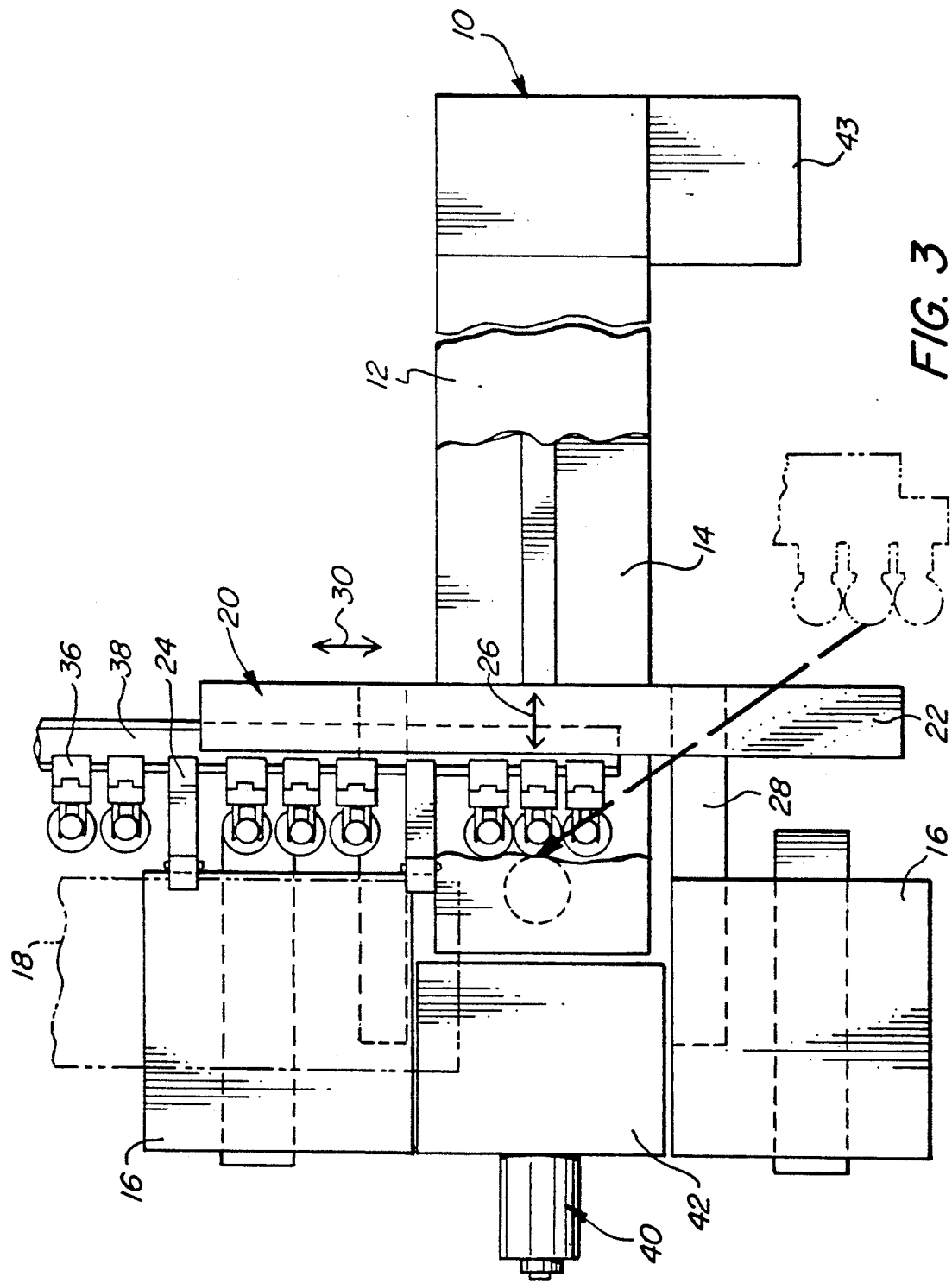
FIG. 3 is a view similar to FIG. 2 with the guidance system and support table moved outwardly.

As indicated diagrammatically in FIGS. 2 and 3, the workpiece guidance system 20 is moved forwardly in the direction indicated by the arrow 26 towards the recesses in the tool mounting assembly until the punch 34 and stripper 46 seat in the recess in the upper portion 48, and the die 44 seats in the die holder 50 comprising the lower portion. At that point, the locking devices 52 and 54 are moved downwardly and upwardly respectively as indicated by the arrows 56 and 58 to engage and retain the punch 34 and the die 44 in the tool mounting assembly. The guidance system 20 is now moved rearwardly to disengage the several tools from the retaining arms 60 of the tool holder 36.

Figure 5:
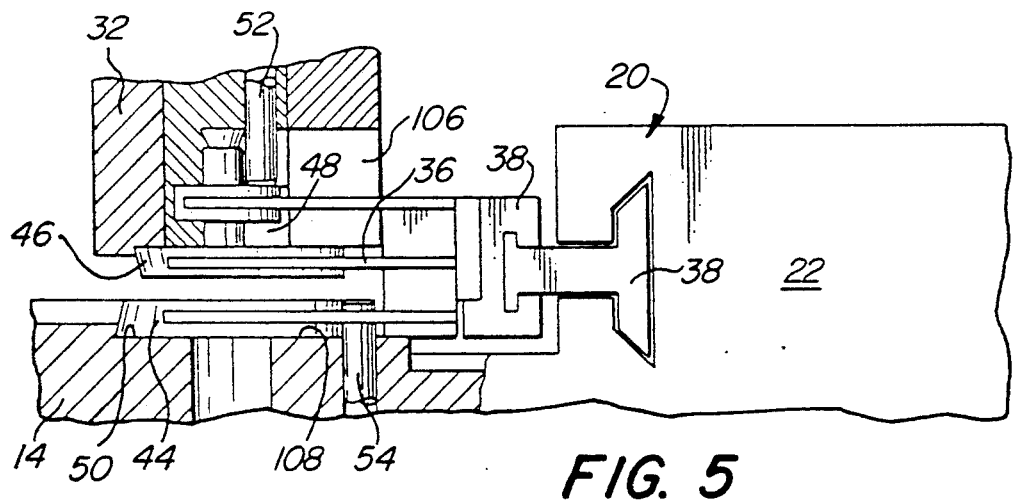
FIG. 5 is a view similar to FIG. 2 with the guidance system moved forwardly with a set of tools in the tool holder in the tool mounting position.
Figure 6:
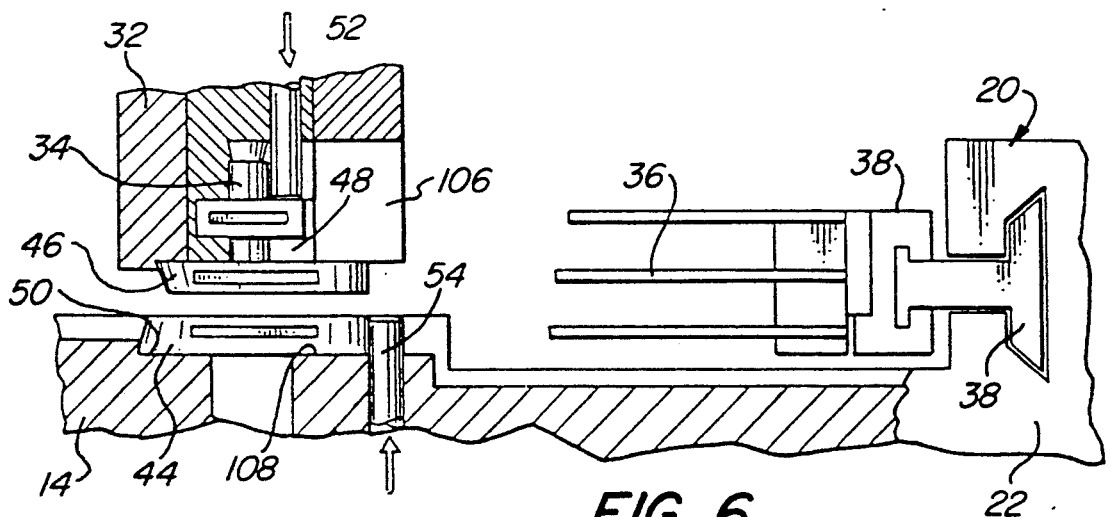
FIG. 6 is a similar view with the tool locking mechanism engaged and with the tool holder and guidance system moved rearwardly.

To effect removal of a set of tools from the tool mounting assembly, an empty tool holder or cassette 36 is moved into the position shown in FIG. 5 so that its arms 60 engage the several tools and the locking devices 52 and 54 are retracted so that the tools are clamped between the arms 60 and withdrawn from the tool receiving recesses of the tool mounting assembly.

Figure 7:
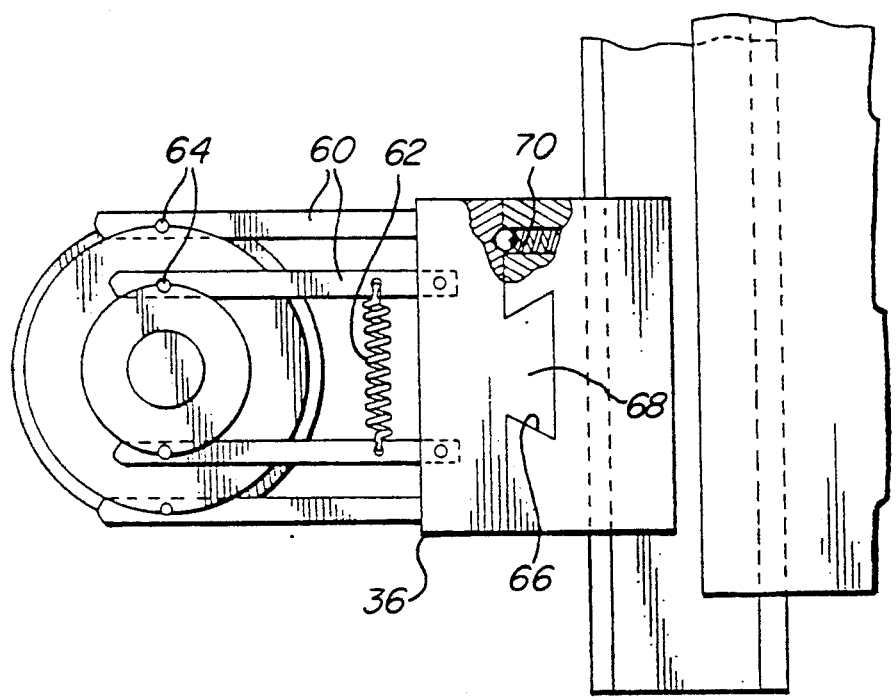
FIG. 7 is a fragmentary plan view of the tool holder assembly seen in FIG. 4.

As seen in FIG. 7, each pair of arms 60 is biased together by springs 62 (only one of which is shown) to grip the appropriate tools therebetween. The arms are pivotable in the base portion of the holder 36 and they have at their outer ends aligning or centering pins 64 which will seat in cooperating grooves or recesses in the periphery of the punch 34, die 44 and stripper 46 (not shown) to ensure precise positioning therewithin. When the set of tools is locked into the tool mounting assembly, and the guidance system 20 is moved rearwardly, the motion will cam the arms 60 apart against the biasing pressure of the springs 62 to release the tools from the arms 60. Similarly, when the empty holder 36 is moved against tools which are mounted within the tool mounting assembly, the cam surfaces at the ends of the arms 36 will cam them apart to allow the tools to be received therebetween until the centering pins 64 seat in the grooves in their periphery.

As seen in FIGS. 7, the intermediate support member 38 has vertically extending slots 66 therein which terminate above its lower end to provide a transverse bottom wall, and the tool holder 36 has a tongue 68 which seats in that slot. The cross section of the slot and of the tongue may be referred to as butterfly shaped. It will be appreciated that the tool holder 36 may be removed from the intermediate support member 38 by lifting it vertically outwardly from the slot 66 in which it is seated. As seen in FIG. 7, to ensure proper vertical spacing of the tool holder 36 within the intermediate support element 38, a spring loaded ball and detent 70 are provided.

Figure 4:
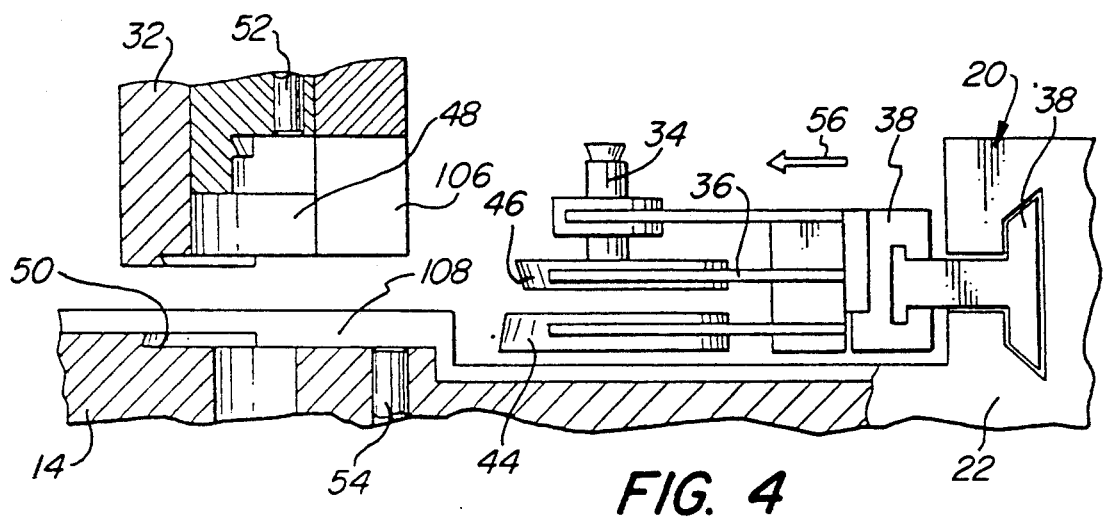
FIG. 4 is a fragmentary sectional view, drawn to an enlarged scale, of the tool mounting assembly area of the punch ram and machine base with the workpiece removed and showing a tool holder supported on the workpiece guidance system transverse rail being moved toward the tool mounting assembly.

As can be seen in FIG. 4, the tool mounting portion of the ram 32 and the die holder 50 have tool receiving passages 106,108 through which the tools are inserted and removed. The ram 32 and die holder 50 are rotated to align these passages 106,108 in direction to cooperate with the operative tool storage and changing assembly.

In Klingel U.S. Pat. No. 4,869,141 granted Sep. 26, 1989, there is illustrated and described a suitable structure for providing the rotation to the lower portion of the ram and the die holder.

To facilitate sliding motion of the workpiece 18 thereon along the X-axis, the top surface of the worktables 16 desirably is provided with rotatable ball elements spaced thereabout (not shown). The workpiece guidance system 20 has a multiplicity of clamps 24 on the transverse rail 22 to grip the workpiece 18 firmly, and these clamps 24 may be opened and closed automatically under action of the computer control 43 by the pneumatic or hydraulic cylinders (not shown) as is well known to those skilled in the art. By so doing, the workpiece 18 may be gripped, released and repositioned within the guidance system 20 for movement on the worktables 16 when so desired.

As previously indicated and as seen in FIGS. 1-3, the workpiece guidance system 20 can move forwardly and rearwardly as shown by the double arrow 26 and from side-to side as shown by the double arrow 30. This effects the desired motion of the workpiece 18 relative to the work station at the ram 32. Movement forwardly and rearwardly shown by the double arrow 26 is generally considered to be movement in the Y axis, and the movement from side-to side in the direction shown by the double arrow 30 is considered to be movement in the X-axis.

As is well known to those skilled in the art, the workpiece guidance system 20 will include gears and racks (not shown) to enable precise motion in both of the axes in response to instructions received from the computer control 43 for the press. Typically the transverse rail 22 will have a toothed rack (not shown) along its rear surface which is engaged with a driven gear (not shown) extending perpendicularly thereto which is engaged with a gear (not shown) in the main portion of the guidance system 20 to effect motion of the entire assembly in the direction of the double arrow 26.

As will be readily appreciated, the intermediate support member 38 and the associated holders 36 are precisely positioned along the length of the transverse rail 22 so that the computer 43 can effect motion of the workpiece guidance system 20 to align the desired holder 36 with the tool mounting assembly by motion along the X-axis. At such time as this alignment has been effected, the computer 43 can then advance the guidance system 20 to bring the tools in the holder 36 into the appropriate portions of the tool mounting assembly.

As will be appreciated, a computer can be utilized to open and close clamps, move the elements of the guidance system and thereby the workpiece and tool holders, and operate the ram.

Figure 8:
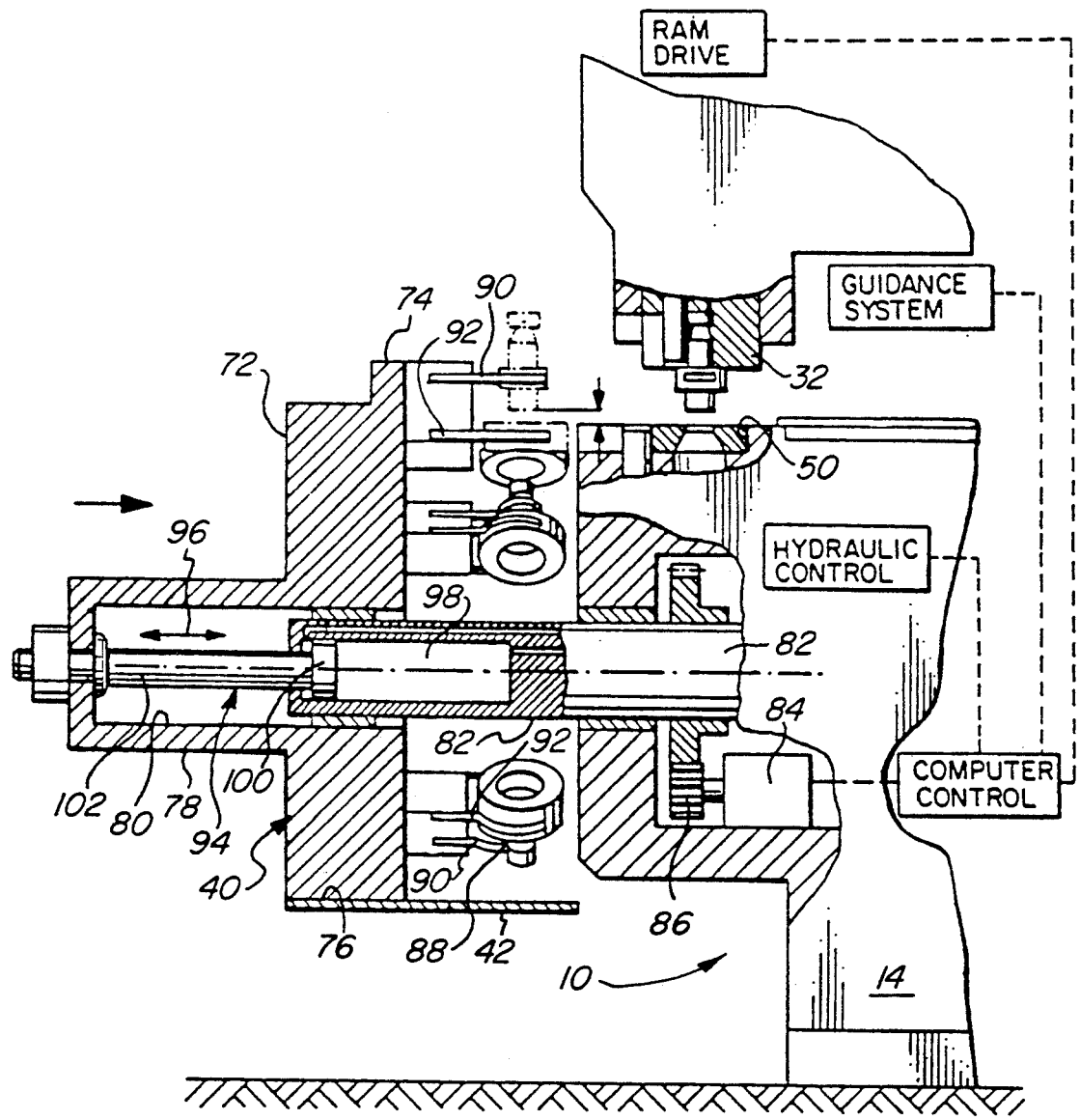
FIG. 8 is a fragmentary side elevational view in partial section of the punch press showing the tool magazine and changer mechanism.
Figure 9:
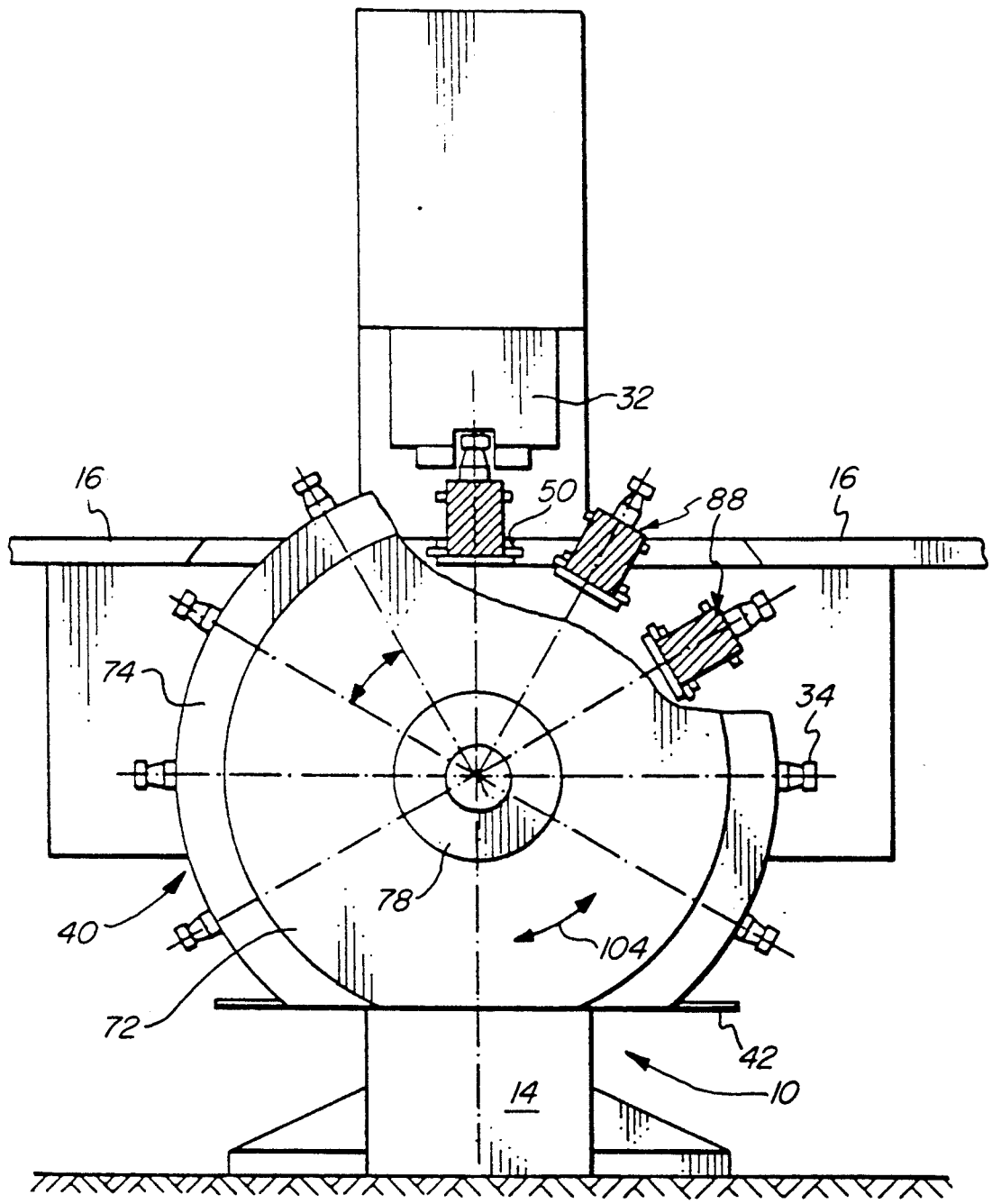
FIG. 9 is a front elevational view thereof.

As previously indicated and as seen in FIGS. 8 and 9, at the front face of the punch press is a tool magazine and changer mechanism generally designated by the numeral 40. The magazine 72 includes a generally circular component 74 which has, at one point about its periphery, a portion thereof removed as indicated by the numeral 76, and the cover plate 42 is secured to the chordal surface provided thereby. Extending outwardly from the center of the circular component 74 is a hub 78, and a bore 80 extends through the circular component 74 and hub 78.

The magazine 72 is rotatably mounted upon the frame 10 by a shaft 82 which seats in bearings disposed in the frame 10 and in the bore 80. Rotation of the shaft 82 about its axis of rotation will thus effect rotation of the magazine 72 about this axis. This rotation is effected by the motor 84 which has its output shaft transmitting the rotational motion to the shaft 82 through the gear drive generally designated by the numeral 86.

At equiangularly spaced points about the inner surface of the arcuate portion of the generally circular component 74 is a series of tool retainer assemblies 88 including the vertically spaced tool retainer elements 90 and 92. Tool sets comprising a cooperating punch 34 and die 44 are releasably seated in the elements 90 and 92. Rotation of the magazine 72 about its axis will locate the retainer elements 90 and 92 in horizontal alignment with the tool mounting assembly in the ram 32 and die holder 50.

To effect transfer of the tooling between the retainer elements 90,92 and the tool mounting assembly, there is incorporated a transfer mechanism generally designated by the numeral 94 to effect reciprocation of the magazine 72 in a horizontal direction as indicated by the double headed arrow 96, and a pair of flow passages communicating therewith from a source of hydraulic fluid which is only diagrammatically illustrated. Seated within the cylinder 98 is a piston 100 which is integral with the rod 102 which is bolted at its outer end to the hub 78.

Upon introduction of hydraulic fluid under pressure from the source to the cylinder 98 on opposite faces of the piston 100, relative motion of the piston 100 inwardly and outwardly will occur in the direction of the double headed arrow 96, thus effecting the reciprocal motion of the entire magazine 72 relative to the base 14.

The tool retainer elements 90,92, if empty, will be moved inwardly and grip a punch 34 and die 44 to effect their removal from the tool mounting assembly. Actuation of the piston 100 is then effected to move the entire magazine 72 back to the position shown in FIG. 8, at which time the motor 84 is actuated to rotate the magazine 72 to locate any selected tooling therein in the uppermost position for insertion into the tool mounting assembly or to rotate the cover plate 42 into the upper position.

If a new set of tools is to be loaded from the magazine 72 the transfer assembly 94 is again actuated to move the tool magazine 72 inwardly, and the tooling 16 in the retainer elements 90,92 is thus transferred into the tool mounting assembly. The transfer assembly 84 is again actuated to move the magazine 72 into the position seen in FIG. 8, thus enabling the operation of the punch press with the new set of tooling.

To effect rotation from the inoperative position wherein the cover plate 42 is disposed upwardly so as to permit unimpaired motion of the workpiece 18 thereover, the electric motor 84 used to effect rotation of the shaft 82 supporting the magazine 72 should be bidirectional to minimize the time required for rotation to locate the selected tooling in the uppermost or operative position for tool exchange. This bidirectional motion is indicated by the arrow 104 in FIG. 9. As soon as the tooling has been moved into the tool mounting assembly, the magazine 72 is again moved outwardly and rotated rapidly to orient the cover plate 42 in the uppermost position and provide an extension of the support plane of the support table 16.

As is customary in computer controlled apparatus, the computer control 43 is programmed to effect many of the motions automatically and in timed relation. It will effect control of the guidance system 20 to move the workpiece 18 and effect operation of the ram 32 to punch the workpiece 18 as it is being moved thereby. When it is desired to change the tooling, the computer control 43 will either actuate the motor 84 to rotate an empty retainer assembly 88 to the uppermost position, or move an empty tool holder 36 on the rail 22 to a position aligned with the work station. The computer 43 may actuate the hydraulic fluid source to move the magazine 72 inwardly until the punch 34 and die 44 are received within the tool retainer elements 90,92, the locking devices 52,54 having been disengaged to permit the withdrawal of the punch 34 and die 44 therefrom. The computer control 43 may then effect rotation of the magazine 72 to locate the desired tooling in the uppermost position, and will actuate the hydraulic fluid source to move the magazine 72 inwardly and thereby move the new tooling into the retainer elements 88,90.

The direction of hydraulic fluid flow is reversed to move the magazine 72 outwardly and the motor 84 is actuated to rotate the magazine 72 to bring the cover plate 42 into the uppermost position for a continuation of the punching operation.

Obviously, this rotation cannot be effected if the workpiece 18 extends beyond the surface of the tables 16 and into the plane of rotation of the magazine 72. Under such circumstances, the control 43 would first effect movement of the workpiece 18 rearwardly on the tables 16 into a remote position to permit the necessary rotation and tool exchange.

In the second instance, the workpiece 18 is moved into a position forwardly of the work station as the rail 22 moved the empty tool holder 36 into the insertion position at which time the locking devices 52,54 are released. The rail 22 and guidance system then move rearwardly to withdraw the tools through the tool receiving passages. The rail 32 may then be indexed to locate a selected tool holder 36 in the tool insertion position. Forward motion will then insert the tools through the tool receiving passages, and the locking devices 52,54 will lock them in position. The guidance system 20 is moved rearwardly to allow the punching operation to continue.

Obviously, the tools may be withdrawn into either tool storage assembly, or inserted from either tool mounting assembly, or withdrawn into one and inserted from the other because the lower portion of the ram may be rotated rapidly to align the tool receiving passages in the appropriate direction.

Although hydraulic mechanisms have been shown to effect movement of the transfer mechanism of the front tool storage assembly, it will be appreciated that pneumatic devices may be employed as can be gear-type devices to effect the desired linear motion.

The number of tool retainers spaced about the magazine may vary substantially. It is necessary, however, that there be adequate spacing between them to ensure that interference will not occur with largely sized tooling seated therein. The amount of the circumference of the magazine which can be utilized for such tooling will depend upon the relative dimensioning of the projecting portion of the base of the punch press and the effective diameter of the magazine.

It will be readily appreciated that the tool magazine and transfer device materially reduces the space requirements for effecting automatic tool change and leaves the space above the workpiece plane free during operation of the machine. By utilizing the magazine itself as the means for effecting the lateral motion for tool transfer a relatively simple and compact assembly is provided.

Although it has not been illustrated in the tool magazine, punch tooling will generally include a stripper as well as a punch and die. It will be appreciated that the retainer elements illustrated can be modified to support stripper tooling for movement into and outwardly of the tool mounting positions in the punch press.

Although the actual peripheral configuration of the magazine can vary, it is essential that the magazine configuration provide a circumferential portion which will not extend above the work support plane when it is rotated into the uppermost position. Moreover, the peripheral portion in which the tooling is carried must extend above the work support plane when rotated to the uppermost position in order to be horizontally aligned with the receptacle for the punch tool and that for the stripper tooling when employed.

Thus, the present invention provides a relatively simple, durable and compact punch press with two separate automatic tool change mechanisms enabling a large amount of tools to be readily placed in operation. The press is compact and relatively easy to fabricate and operate using standard computer controls.

Having thus described the invention, what is claimed is:

1. In a punch press, the combination comprising:
   (a) a frame having a base and a head spaced thereabove with a neck extending therebetween at one end thereof;
   (b) a ram reciprocatably mounted in said head for reciprocal movement relative to said base along a vertical axis defining a work station, at least the lower portion of said ram being rotatable about said axis:
   (c) die holding means rotatably mounted in said base at said work station;
   (d) tool mounting means in said lower portion of said ram and in said die holding means for releasably mounting a cooperating punch and die, said mounting means having tool receiving passages at one point about the periphery thereof;
   (e) work support table means about said work station with its upper surface providing a workpiece support;
   (f) a workpiece guidance system including an elongated rail extending transversely of said base adjacent said neck, said system being supported on said frame for clamping an associated workpiece and effecting its movement on said work table relative to said work station along horizontal, perpendicularly oriented X and Y axes;
   (g) a multiplicity of tool holders supported on said rail for movement therewith, said tool holders projecting forwardly therefrom and having tool seating portions at the forward end thereof;
   (h) punch and die sets in at least some of said tool holders;
   (i) means for moving said rail with said tool holders to cause said tool holders to abut the tool mounting means in said ram and die holding means and transfer a punch and die between said holders and said tool mounting means;
   (j) a tool storage and transfer assembly at the opposite end of said frame including:
      (i) a magazine having its principal dimensions extending in a vertical plane parallel to the axis of reciprocation of said ram and rotatable about a horizontal axis perpendicular thereto, said magazine having a major portion with a periphery circumscribing an arc of a first radial distance from said horizontal axis and a minor portion having a periphery of a second radial distance from said horizontal axis reduced from that of said first radial distance, the peripheries of said major and minor portions being generally continuous and defining a closed geometric figure, said magazine having a multiplicity of tool holders at spaced points about said periphery of said major portion and each adapted to seal releasably a punch and die to seat in the tool mounting means;
      (ii) means mounting said magazine for rotation about said horizontal axis which is spaced a distance below the plane of said work support surface, said distance being of a dimension to locate said tool holders in horizontal alignment with said tool mounting means when said magazine is rotated to locate them in the uppermost position, said magazine minor portion reduced radial distance being of a dimension relative to said horizontal axis so that its periphery does not extend above the plane of said work support surface when rotated into the uppermost position;

(iii) means for transferring tooling between the uppermost tool holder of said magazine and the tool mounting means of said punch press; and (iv) means for rotating said magazine to orient a selected tool mounting receptacle in said uppermost position for tooling transfer by said transferring means and for thereafter rotating said magazine to orient said reduced peripheral portion in said uppermost position so that said plane of said workpiece support surface is not spaced above said magazine to permit free motion of a workpiece thereover on said workpiece support surface; and (k) control means (i) for effecting rotation of said lower portion of said ram and of said die holding means;

(ii) for effecting rotation of said magazine and operation of said transferring means; and (iii) for effecting movement of said rail to effect transfer of tooling to and from its tool holders, whereby said lower portion of said ram and said die holder may be rotated to orient the tool receiving passages for receiving, or discharging tools to the tool holder on said rail, and the tool holders in said magazine.

2. The punching machine according to claim 1 wherein aid tool holders are removably supported on said rail so that tool holders may be readily replaced on said rail.

3. The punch press according to claim 1 wherein said machine includes a control means which controls movement of said guidance system is adapted to move said rail to bring said tool holder into alignment with said work station and then to move said tool holder forwardly to said work station and insert said tools into said tool mounting means.

4. The punch press according to claim 1 wherein said control means orients the tool receiving passages of said ram and said die holding means into a position facing said tool storage and transfer assembly, effects rotation of said magazine of said tool storage and transfer assembly to align an empty tool holder therewith transfers the tooling in said tool mounting means therefrom and into said empty tool holder, effects rotation of said ram lower portion and die support to orient the tool receiving passages facing said rail, and moves said rail to bring a selected tool holder thereon into alignment with said tool mounting means and transfers said tools therein into said tool mounting means.

5. The punch press according to claim 1 wherein said control means effects rotation of said ram lower portion and die support to orient the tool receiving passages facing said rail, moves said rail to bring an empty tool holder thereon into alignment with said tool mounting means and to transfer said tools in said tool mounting means into said tool holder, orients the tool receiving passages of said ram and die holding means into a position facing said tool storage and transfer assembly, effects rotation of said magazine of said tool storage and transfer assembly to align a selected tool holder therewith, and transfer the tooling from said tool mounting means therefrom into said empty tool holder, and effects rotation of said ram lower portion and die support to orient the tool receiving passages facing said rail, moves said rail to bring an empty tool holder thereon into alignment with said tool mounting means and to transfer said tools in said tool mounting means into said tool holder.

6. The punch press according to claim 1 wherein said work table is movable relative to said work station and said control means is effective to control movement thereof.

7. The punch press according to claim 1 wherein said control means is operative to move said work support table with an associated workpiece thereon to support the workpiece as it is moved to a position spaced beyond said work station during tool changing movement of said rail.

8. The punch press according to claim 7 wherein said control means is operative to move said work support table with a workpiece supported thereon to support the workpiece as it is moved by the guidance system to a position inwardly of the work station during tool changing movement of said tool storage and transfer assembly.

9. The punch press according to claim 1 wherein said tool holders have a pair of spaced tool carrying seats for a cooperating punch and die set, said tool carrying seats being horizontally aligned with said punch mounting means of said ram and said die holding means when moved into the tool changing position.

10. The punch press according to claim 1 wherein said magazine, mounting means and transfer means are disposed upon a common base which is removably engageable with said punch press frame.

11. The punch press according with claim 1 wherein said magazine is of truncated generally circular peripheral configuration with a portion of its periphery removed to provide a chordal surface at a radial distance not greater than the radial spacing to the plane of the work support table.

12. In a method for punching a workpiece, the steps comprising:

(a) providing a punch press with (i) a frame having a base and a head spaced thereabove with a neck extending therebetween at one end thereof;

(ii) a ram reciprocatably mounted in said head for reciprocal movement relative to said base along a vertical axis defining a work station, at least the lower portion of said ram being rotatable about said axis;

(iii) die holding base at said work station;

(iv) tool mounting means in said lower portion of said ram and in said die holding means for releasably mounting a cooperating punch and die, said mounting means having tool receiving passages at one point about the periphery thereof;

(v) work support table means about said work station with its upper surface providing a workpiece support;

(vi) a workpiece guidance system including an elongated rail extending transversely of said base adjacent said neck, said system being supported on said frame for clamping an associated workpiece and effecting its movement on said work table relative to said work station along horizontal, perpendicularly oriented X and Y axes;

(vii) a multiplicity of tool holders supported on said rail for movement therewith, said tool holders projecting forwardly therefrom and having tool seating portions at the forward end thereof;

(viii) punch and die sets in at least some of said tool holders;

(ix) means for moving said rail with said tool holders to cause said tool holders to abut the tool mounting means in said ram and die holding means and transfer a punch and die between said holders and said tool mounting means;

(x) a tool storage and transfer assembly at the opposite end of said frame including:

(A) a magazine having its principal dimensions extending in a vertical plane parallel to the axis of reciprocation of said ram and rotatable about a horizontal axis perpendicular thereto, said magazine having a major portion with a periphery circumscribing an arc of a first radial distance from said horizontal axis and a minor portion having a periphery of a second radial distance from said horizontal axis reduced from that of said first radial distance, the peripheries of said major and minor portions being generally continuous and defining a closed geometric figure, said magazine having a multiplicity of tool holders at spaced points about said periphery of said major portion and each adapted to seal releasably a punch and die to seat in the tool mounting means with punch and die sets in at least some of said holders;

(B) means mounting said magazine for rotation about said horizontal axis which is spaced a distance below the plane of said work support surface, said distance being of a dimension to locate said tool holders in horizontal alignment with said tool mounting means when said magazine is rotated to locate them in the uppermost position, said magazine minor portion reduced radial distance being of a dimension relative to said horizontal axis so that its periphery does not extend above the plane of said work support surface when rotated into the uppermost position;

(C) means for transferring tooling between the uppermost tool holder of said magazine and the tool mounting means of said punch press; and (D) means for rotating said magazine to orient a selected tool mounting receptacle in said uppermost position for tooling transfer by said transferring means and for thereafter rotating said magazine to orient said reduced peripheral portion in said uppermost position so that said plane of said workpiece support surface is not spaced above said magazine to permit free motion of a workpiece thereover on said workpiece support surface; and (xi) control means (A) for effecting rotation of said lower portion of said ram and of said die holding means;

(B) for effecting rotation of said magazine and operation of said transferring means; and (C) for effecting movement of said rail to effect transfer of tooling to and from its tool holders;

(b) placing a workpiece on said work table support means and clamping it in said guidance system;

(c) rotating said lower portion of said ram and said die holding means to orient said tool receiving passages facing said tool storage and transfer assembly;

(d) activating said guidance system to move said workpiece inwardly of said work station;

(e) transferring into said tool mounting means a selected set for tools from a tool holder stored in said magazine;

(f) punching said workpiece with said set of tools;

(g) activating said guidance system to move said workpiece inwardly of said work station;

(h) returning the tooling in said tool mounting means into said tool holder of said magazine;

(i) rotating said lower portion of said ram and said die holding means to orient said rail;

(j) activating said guidance system to move said workpiece outwardly of said work station;

(k) activating said guidance system to move said rail and transfer into said tool mounting means a second selected set of tools from a tool holder on said rail; and (l) punching said work piece with said second selected set of tools.

13. The punching method in accordance with claim 12 wherein said control means is operative to move said work support table means inwardly and outwardly of said work station concurrently with said workpiece.

14. In a method for punching a workpiece, the steps comprising:

(a) providing a punch press with (i) a frame having a base and a head spaced thereabove with a neck extending therebetween at one end thereof;

(ii) a ram reciprocatably mounted in said head for reciprocal movement relative to said base along a vertical axis defining a work station, at least the lower portion of said ram being rotatable about said axis;

(iii) die holding means rotatably mounted in said base at said work station;

(iv) tool mounting means in said lower portion of said ram and in said die holding means for releasably mounting a cooperating punch and die, said mounting means having tool receiving passages at one point about the periphery thereof;

(v) work support table means about said work station with its upper surface providing a workpiece support;

(vi) a workpiece guidance system including an elongated rail extending transversely of said base adjacent said neck, said system being supported on said frame for clamping an associated workpiece and effecting its movement on said work table relative to said work station along horizontal, perpendicularly oriented X and Y axes;

(vii) a multiplicity of tool holders supported on said rail for movement therewith, said tool holders projecting forwardly therefrom and having tool seating portions at the forward end thereof;

(viii) punch and die sets in at least some of said tool holders;

(ix) means for moving said rail with said tool holders to cause said tool holders to abut the tool mounting means in said ram and die holding means and transfer a punch and die between said holders and said tool mounting means;

(x) a tool storage and transfer assembly at the opposite end of said frame including:
  (A) a magazine having its principal dimensions extending in a vertical plane parallel to the axis of reciprocation of said ram and rotatable about a horizontal axis perpendicular thereto, said magazine having a major portion with a periphery circumscribing an arc of a first radial distance from said horizontal axis and a minor portion having a periphery of a second radial distance from said horizontal axis reduced from that of said first radial distance, the peripheries of said major and minor portions being generally continuous and defining a closed geometric figure, said magazine having a multiplicity of tool holders at spaced points about said periphery of said major portion and each adapted to seal releasably a punch and die to seat in the tool mounting means with punch and die sets in at least some of said holders;
  (B) means mounting said magazine for rotation about said horizontal axis which is spaced a distance below the plane of said work support surface, said distance being of a dimension to locate said tool holders in horizontal alignment with said tool mounting means when said magazine is rotated to locate them in the uppermost position, said magazine minor portion reduced radial distance being of a dimension relative to said horizontal axis so that its periphery does not extend above the plane of said work support surface when rotated into the uppermost position;
  (C) means for transferring tooling between the uppermost tool holder of said magazine and the tool mounting means of said punch press; and
  (D) means for rotating said magazine to orient a selected tool mounting receptacle in said uppermost position for tooling transfer by said transferring means and for thereafter rotating said magazine to orient said reduced peripheral) portion in said uppermost position so that said plane of said workpiece support surface is not spaced above said magazine to permit free motion of a workpiece thereover on said workpiece support surface; and (xi) control means
  (A) for effecting rotation of said lower portion of said ram and of said die holding means;
  (B) for effecting rotation of said magazine and operation of said transferring means; and
  (C) for effecting movement of said rail to effect transfer of tooling to and from its tool holders;

(b) placing a workpiece on said work table support means and clamping it in said guidance system;

(c) rotating said lower portion of said ram and said die holding means to orient said tool receiving passages facing said rail;

(d) activating said guidance system to move said workpiece outwardly of said work station;

(e) transferring into said tool mounting means a selected set of tools from a tool holder stored on said rail;

(f) punching said workpiece with said set of tools;

(g) activating said guidance system to move said workpiece outwardly of said work station;

(h) returning the tooling in said tool mounting means into said tool holder of said rail;

(i) rotating said lower portion of said ram and said die holding means to orient said tool receiving passages facing said tool storage and transfer assembly;

(j) activating said guidance system to move said workpiece inwardly of said work station;

(k) transferring into said tool mounting means a second selected set of tools stored in said magazine; and (l) punching said work piece with said second selected set of tools.

15. The punching method in accordance with claim 13 wherein said control means is operative to move said work support table means inwardly and outwardly concurrently with said workpiece.

* * * * *

UNITED STATES PATENT AND TRADEMARK OFFICE
CERTIFICATE OF CORRECTION

PATENT NO. : 5,224,915
DATED : July 6, 1993
INVENTOR(S) : Friedrich Killian

It is certified that error appears in the above-identified patent and that said Letters Patent is hereby corrected as shown below:

Column 12, line 55, after "holding", please insert --means rotatably mounted in said--.

Signed and Sealed this

First Day of March, 1994

BRUCE LEHMAN

Attest:

Attesting Officer

Commissioner of Patents and Trademarks